(12) United States Patent
Asano

(10) Patent No.: US 9,712,471 B2
(45) Date of Patent: Jul. 18, 2017

(54) MAIL SENDING/RECEIVING APPARATUS, METHOD, AND RECORDING MEDIUM RECORDING PROGRAM

(71) Applicant: ALPINE ELECTRONICS, INC., Shinagawa-ku, Tokyo (JP)

(72) Inventor: Michinao Asano, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 160 days.

(21) Appl. No.: 14/713,475

(22) Filed: May 15, 2015

(65) Prior Publication Data

US 2015/0372958 A1    Dec. 24, 2015

(30) Foreign Application Priority Data

Jun. 21, 2014   (JP) .................. 2014-127777

(51) Int. Cl.
*H04L 12/58* (2006.01)
*G06Q 10/10* (2012.01)

(52) U.S. Cl.
CPC .......... *H04L 51/16* (2013.01); *G06Q 10/107* (2013.01); *H04L 51/24* (2013.01); *H04L 51/30* (2013.01)

(58) Field of Classification Search
CPC ............................ H04L 51/16; G06Q 10/107
See application file for complete search history.

(56) References Cited

U.S. PATENT DOCUMENTS

| 7,590,539 B1 * | 9/2009 | Kirkpatrick ........... H04L 12/587 379/88.01 |
| 8,131,806 B2 * | 3/2012 | Chen .................... G06Q 10/107 707/692 |
| 2005/0107127 A1 * | 5/2005 | Moriya ............. G06F 17/30265 455/566 |
| 2014/0012923 A1 * | 1/2014 | Caldwell .............. G06Q 10/107 709/206 |
| 2015/0100644 A1 * | 4/2015 | Gulik ...................... H04L 51/16 709/206 |

FOREIGN PATENT DOCUMENTS

JP    2008-097218    4/2008

* cited by examiner

*Primary Examiner* — Jeong S Park
(74) *Attorney, Agent, or Firm* — Brinks Gilson & Lione (57) ABSTRACT

A vehicle-mounted apparatus includes a mail receiving processing unit configured to receive an electronic mail, a received mail determination unit configured to determine, after a first electronic mail is received by the mail receiving processing unit, whether a second electronic mail associated with the first electronic mail is received by the mail receiving processing unit, and a notification processing unit configured to perform, when it is determined by the received mail determination unit that the first electronic mail and the second electronic mail are associated with each other, notification of these two electronic mails simultaneously.

17 Claims, 4 Drawing Sheets

MAIL SENDING/RECEIVING APPARATUS, METHOD, AND RECORDING MEDIUM RECORDING PROGRAM

RELATED APPLICATION

The present application claims priority to Japanese Patent Application Number 2014-127777, filed Jun. 21, 2014, the entirety of which is hereby incorporated by reference.

BACKGROUND

1. Field of the Invention

The present invention relates to electronic mail sending/receiving apparatus for sending and receiving electronic mail including either one of a text and an image, a method, and a recording medium recording a program.

2. Description of the Related Art

There has been conventionally known a mobile terminal that determines, for electronic mails received from the same sender, whether mail reception notification is to be performed, based on the reception interval between these mails, and appropriately switches between performing notification and not performing notification (for example, refer to JP 2008-97218 A). In this mobile terminal, when electronic mails are frequently sent and received, even if the electric mail reception notification is not performed, the holder of the mobile terminal can easily recognize the electronic mail reception. Specifically, the mobile terminal is configured not to perform the reception notification of the electronic mail if an electronic mail is received/sent within a predetermined time.

Recently, the number of registrants of an instant messenger service called LINE® has been increasing. By using LINE, a LINE mail including text or an image is exchanged between mobile terminals with a simple operation. In this LINE mail system, a text message including text and an image such as an illustration called "stamp" are separately exchanged. Accordingly, when text and a stamp related to the content of the text are sent, a LINE mail including the text is first sent, and a LINE mail including the stamp is subsequently sent.

When two LINE mails are successively sent in this manner, whether to perform notification at the time of the LINE mail reception is determined using the technique disclosed in JP 2008-97218 A mentioned above, and notification is not performed when the second LINE mail is received. Thus, the recipient of the mail may fail to recognize the reception of the stamp. In contrast, if the mobile terminal is configured to perform notification every time a LINE mail is received, without using the technique disclosed in JP 2008-97218 A, such recognition failure may not occur. This, however, causes the following problem. Notification is performed every time each of a plurality of LINE mails associated with each other is received, which involves the cumbersome operation of checking the content of the received LINE mail every time notification is performed. When a plurality of LINE mails is received using a vehicle-mounted apparatus, even if reception notification of these LINE mails is performed at a short time interval, it is not easy to separately check the contents of the respective LINE mails every time notification is performed. In particular, if a plurality of LINE mails respectively including text and an image associated with the text is consecutively received in a short time interval, it is considered to be sufficient that the contents of the respective LINE mails are checked at the time when this series of LINE mails is received. Nevertheless, the conventional techniques including the above-mentioned technique of JP 2008-97218 A cannot deal with such a content checking method.

SUMMARY

The present invention has been devised in view of such a point, and the object of embodiments of the present invention is to provide a mail sending/receiving apparatus, a method, and a program that can reduce the trouble of content check by performing notification a small number of times when a plurality of mails associated with each other is received.

To solve the above-mentioned issue, a mail sending/receiving apparatus according to the present disclosure is a mail sending/receiving apparatus for sending and receiving an electronic mail including at least one of a character string and an image, and includes a mail receiving unit configured to receive the electronic mail, a received mail determination unit configured to determine, after a first electronic mail is received by the mail receiving unit, whether a second electronic mail associated with the first electronic mail is received by the mail receiving unit, and a notification unit configured to perform, when it is determined by the received mail determination unit that the first electronic mail and the second electronic mail are associated with each other, notification of the first and the second electronic mails simultaneously.

In addition, a mail sending/receiving method according to the present disclosure is a mail sending/receiving method for sending and receiving an electronic mail including at least one of a character string and an image, and includes a mail receiving step of receiving the electronic mail by a mail receiving unit, a received mail determination step of determining, by a received mail determination unit, after a first electronic mail is received by the mail receiving unit, whether a second electronic mail associated with the first electronic mail is received by the mail receiving unit, and a notification step of performing, when it is determined by the received mail determination unit that the first electronic mail and the second electronic mail are associated with each other, notification of the first and the second electronic mails simultaneously by a notification unit.

In addition, a mail sending/receiving program according to the present disclosure causes a computer to function as a mail receiving unit configured to receive an electronic mail including at least one of a character string and an image, a received mail determination unit configured to determine, after a first electronic mail is received by the mail receiving unit, whether a second electronic mail associated with the first electronic mail is received by the mail receiving unit, and a notification unit configured to perform, when it is determined by the received mail determination unit that the first electronic mail and the second electronic mail are associated with each other, notification of the first and the second electronic mails simultaneously.

When a plurality of electronic mails associated with each other is received at different times, performing notification in accordance with an electronic mail received later reduces notification occasions, so that the trouble of checking the content of a received mail can be reduced.

In addition, it is desirable that the above-mentioned received mail determination unit determines that the first electronic mail and the second electronic mail are associated with each other in a case where the second electronic mail is received from the same sender as that of the first electronic mail within a predetermined time from when the first electronic mail is received. If a plurality of electronic mails is sent from the same sender to the same recipient within a short time, it is highly probable that the contents of the plurality of electronic mails are associated with each other. Thus, collectively performing notification of these electronic mails substantially reduces the trouble of checking the contents by the recipient of these electronic mails.

In addition, it is desirable that the above-mentioned mail receiving unit receives the first electronic mail only including one of a character string and an image and the second electronic mail only including the other one of the character string and the image. If text (character string) and an image associated with the text are sent and received as separate electronic mails, notification can be performed after the reception of both of the text and the image is completed. As a result, a user can simultaneously check the contents of the text and the image.

In addition, it is desirable that a voice output unit configured to output voice by reading out the above-mentioned character string and a display unit configured to display the image are further included, and the notification unit performs, in a case where each of the first and the second electronic mails only includes the character string, the notification by performing voice output corresponding to the included character string, from the voice output unit, and performs, in a case where each of the first and the second electronic mails only includes the image, the notification by displaying the included image on the display unit. Reading out a character string included in a received electronic mail facilitates the checking of its content.

In addition, it is desirable that the above-mentioned notification unit simultaneously performs voice output by the voice output unit and image display by the display unit in a case where one of the first and the second electronic mails only includes the character string, and the other one of the first and the second electronic mails only includes the image. This enables the user to check the content of the character string through the voice output while looking at the image associated with the character string. This further facilitates the checking of the respective contents of the character string and the image.

In addition, it is desirable that one of the first and the second electronic mail includes the character string, and the other one of the first and the second electronic mails includes the image, and the received mail determination unit determines whether there is association between the first electronic mail and the second electronic mail based on respective contents of the character string and the image. If there is association between the respective contents of a character string and an image, collectively performing notification of a plurality of electronic mails including the character string and the image as contents can substantially reduce the trouble of checking the contents by the recipient of these electronic mails.

In addition, it is desirable that the above-mentioned mail sending/receiving apparatus is mounted in a vehicle. The operability, the screen visibility, and the like of the mail sending/receiving apparatus mounted in a vehicle are far from excellent. Nevertheless, in such a case, by reducing the number of times notification is performed at the time when an electronic mail is received, the operation and the trouble of checking content can be improved.

DETAILED DESCRIPTION

Figure 1:
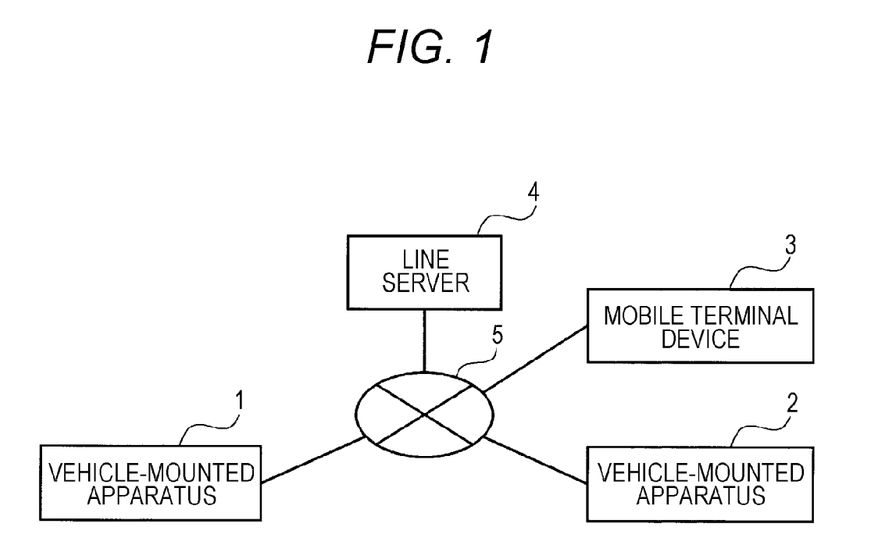
FIG. 1 is a diagram illustrating the general configuration of a mail sending/receiving system including a vehicle-mounted apparatus of an embodiment.

A vehicle-mounted apparatus of an embodiment to which a mail sending/receiving apparatus of the present disclosure is applied will be described below with reference to the drawings. FIG. 1 is a diagram illustrating the general configuration of a mail sending/receiving system including a vehicle-mounted apparatus of an embodiment. The mail sending/receiving system of the present embodiment includes a vehicle-mounted apparatus 1 mounted in a vehicle and a LINE server 4 connected to the vehicle-mounted apparatus 1 via a network 5. In addition, another vehicle-mounted apparatus 2, a mobile terminal device 3, and the like are connected to the network 5. The vehicle-mounted apparatus 2 and the mobile terminal device 3 each serve as a partner that exchanges a LINE mail with the vehicle-mounted apparatus 1.

The vehicle-mounted apparatus 1 may include functions such as a navigation device and an audio device. The vehicle-mounted apparatus 1 further includes functions such as Internet connection and LINE mail sending/receiving, and is mounted in the vehicle. In addition, the LINE server 4 is connected to the vehicle-mounted apparatuses 1 and 2, the mobile terminal device 3, and the like, as appropriate, and performs processing related to LINE mail sending/receiving. The network 5 is, for example, the Internet, and is connected to the vehicle-mounted apparatus 1 via a cell phone (not illustrated) serving as a mobile phone and a base station (not illustrated) that are connected to the vehicle-mounted apparatus 1. The connection between the vehicle-mounted apparatus 1 and the network 5 may not necessarily be performed via the cell phone. The connection may be performed via a communication device (not illustrated) for wireless local area network (LAN) and an access point (not illustrated) that are connected to (or built in) the vehicle-mounted apparatus 1. Alternatively, the vehicle-mounted apparatus 1 may be configured to perform connection using the wireless LAN in a case where the vehicle-mounted apparatus 1 can be connected to the network 5 using the wireless LAN, and to perform connection using the cell phone in a case where the connection using the wireless LAN cannot be performed (e.g., in a case where there is no access point in the vicinity). Alternatively, the vehicle-mounted apparatus 1 may incorporate the function of a cell phone instead of externally connecting a cell phone to the vehicle-mounted apparatus 1.

Figure 2:
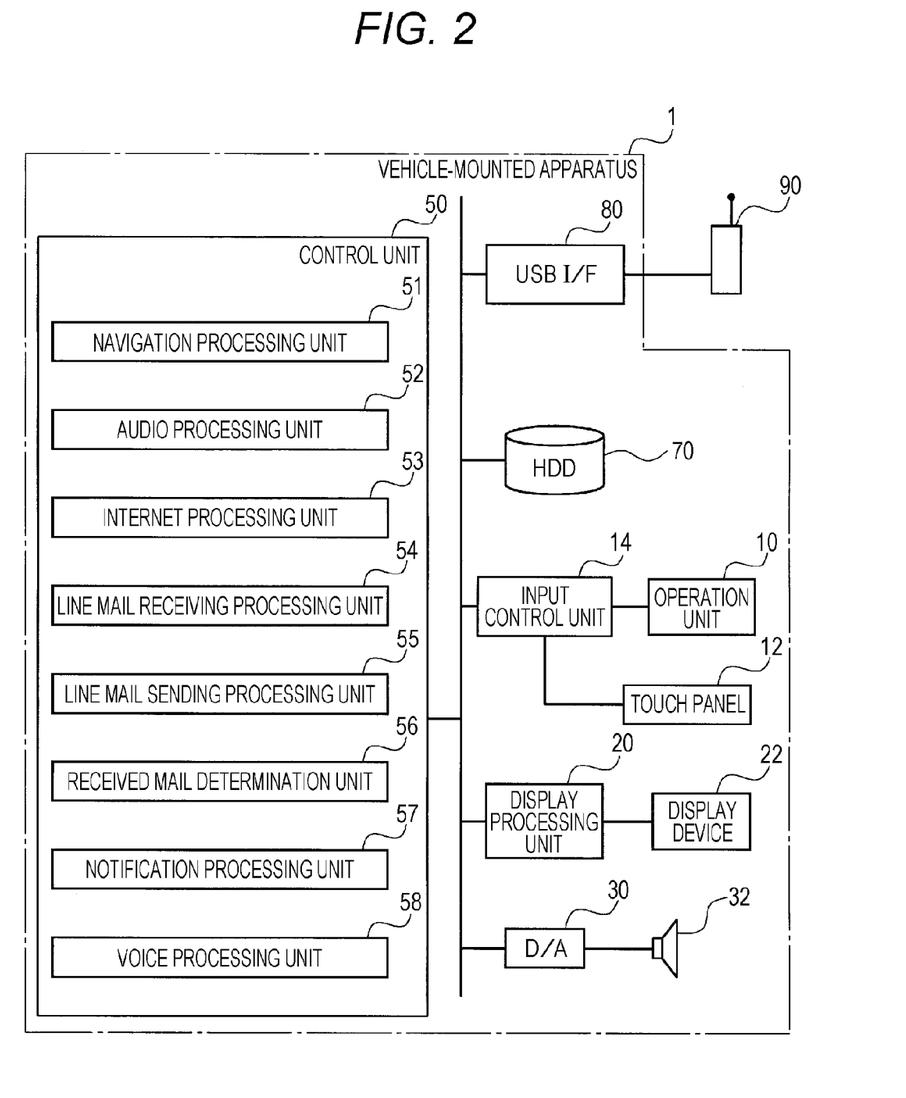
FIG. 2 is a diagram illustrating a configuration of a vehicle-mounted apparatus.

FIG. 2 is a diagram illustrating a configuration of the vehicle-mounted apparatus 1. As illustrated in FIG. 2, the vehicle-mounted apparatus 1 includes an operation unit 10, a touch panel 12, an input control unit 14, a display processing unit 20, a display device 22, a digital-to-analog (D/A) converter 30, a loudspeaker 32, a control unit 50, a hard disc drive (HDD) 70, and a universal serial bus (USB) interface (USB I/F) unit 80.

The operation unit 10 is provided for receiving an operation performed by a user to the vehicle-mounted apparatus 1. The operation unit 10 includes various operation keys, operation switches, operation knobs, and the like that may be disposed around the display device 22. In addition, the operation unit 10 is configured to enable the user to select, at the time when various operation screens and input screens are displayed on the display device 22, a display item of these operation screens and input screens by directly indicating a part of these operation screens and input screens via a finger or the like. To enable such an operation using the operation screens and the input screens, the touch panel 12 for detecting the pointed position of the finger or the like is provided. Alternatively, the operation unit 10 may be configured to select a part of the operation screens and the input screens according to an instruction from the user, using a remote control unit or the like instead of using the touch panel 12. The input control unit 14 monitors the operation unit 10 and the touch panel 12, and determines the operation contents of these units.

The display processing unit 20 outputs a video signal for displaying various operation screens, input screens, processing screens, and the like to display these screens on the display device 22. The display processing unit 20 further outputs a video signal for displaying an Internet screen, a video screen corresponding to a moving image, and the like to display these screens on the display device 22. The display device 22 may be installed in the front middle of a driver seat and a front passenger seat. An example of the display device 22 includes a liquid crystal display (LCD).

The D/A converter 30 converts voice data and music data, that are generated along with moving image reproduction and music reproduction, into analog voice signals, and outputs the analog signals from the loudspeaker 32. In addition, in the present embodiment, when voice data corresponding to text (text data) included in a LINE mail is generated for reading out the text, the generated voice data is converted by the D/A converter 30 into an analog voice signal and output from the loudspeaker 32. Actually, an amplifier for amplifying a signal is connected between the D/A converter 30 and the loudspeaker 32. This amplifier, however, is omitted in FIG. 2. In addition, although the set of the D/A converter 30 and the loudspeaker 32 may be provided for a number of reproduction channels, only one set thereof is illustrated in FIG. 2.

The control unit 50 is provided for controlling the entire vehicle-mounted apparatus 1 and performing Internet connection, LINE mail sending/receiving, and other various types of processing (e.g., navigation processing). The control unit 50 functions as a computer for implementing various types of processing by a central processing unit (CPU) executing a predetermined application (e.g., a navigation program and a mail sending/receiving program) stored in a read-only memory (ROM), a random access memory (RAM), or the like.

The HDD 70 stores data necessary for various types of processing performed by the control unit 50. For example, the HDD 70 stores map data necessary for the navigation processing, music data to be audio-reproduced, and the like.

The USB I/F unit 80 is provided for performing input and output of signals with the cell phone 90 and other USB devices via a USB cable. The USB I/F unit 80 includes a USB port and a USB host controller.

In addition, the above-mentioned control unit 50 includes a navigation processing unit 51, an audio processing unit 52, an Internet processing unit 53, a LINE mail receiving processing unit 54, a LINE mail sending processing unit 55, a received mail determination unit 56, a notification processing unit 57, and a voice processing unit 58.

The navigation processing unit 51 is implemented by executing a navigation application. For example, this navigation processing unit 51 performs map image drawing processing, route guidance processing, and route navigation processing. In the map image drawing processing, the navigation processing unit 51 reads, from the HDD 70, map data necessary for displaying a vehicle-position vicinity map image, and draws the vehicle-position vicinity map image. In the route guidance processing, the navigation processing unit 51 sets a travel route to a destination. In the route navigation processing, the navigation processing unit 51 guides vehicle travel along this set travel route. Through these types of processing, the vehicle-position vicinity map image, an intersection guidance image necessary for route navigation, and the like are displayed on the display device 22. In addition, guidance voice for performing intersection guidance is output from the loudspeaker 32.

The audio processing unit 52 is implemented by executing an audio processing application. This audio processing unit 52 reads music data from the HDD 70 to perform various types of processing necessary for music reproduction. For example, the audio processing unit 52 decompresses compressed music data to generate data to be input to the D/A converter 30, and performs processing such as selection and fast-forward of reproduction music.

The Internet processing unit 53 is implemented by executing an Internet connection application. This Internet processing unit 53 functions as a web browser. The Internet processing unit 53 performs Internet connection via the USB I/F unit 80 and the cell phone 90 to exchange data with various servers.

The LINE mail receiving processing unit 54 performs processing of receiving a LINE mail sent from a specific communication partner. This LINE mail includes any of text (character string), an image, and the like.

The LINE mail sending processing unit 55 creates a LINE mail including either one of text and an image. In addition, the LINE mail sending processing unit 55 performs processing of sending this created LINE mail to a specific communication partner.

The received mail determination unit 56 determines, after a first LINE mail is received by the LINE mail receiving processing unit 54, whether a second LINE mail associated with this first LINE mail is received. For example, if the second LINE mail is received from the same sender as that of this first LINE mail within a predetermined time (e.g., 10 seconds) from when the first LINE mail is received, the received mail determination unit 56 determines that the first LINE mail and the second LINE mail are associated with each other.

Alternatively, if text (character string) is included in either one of the first and the second LINE mails while an image such as a stamp is included in the other one of them, the received mail determination unit 56 determines, based on the respective contents of the text and the image, whether there is association between the first LINE mail and the second LINE mail. For example, the presence or absence of association is determined as follows. First, a feature of each stamp is extracted using image recognition or the like, in advance or every time a stamp is received. Along with the stamp feature extraction, a keyword included in the text is extracted. Next, the extracted feature and keyword are compared, whereby the presence or absence of association is determined.

When the received mail determination unit 56 determines that the first LINE mail and the second LINE mail are associated with each other, the notification processing unit 57 performs notification of these first and second LINE mails simultaneously. For example, if the content of a LINE mail is text, notification of the LINE mail is performed by displaying a character string constituting this text on the display device 22, or outputting voice by reading out the text from the loudspeaker 32. If the content of a LINE mail is an image such as a stamp, notification of the LINE mail is performed by displaying this image on the display device 22.

When notification of a LINE mail including text is performed by voice output, the voice processing unit 58 generates voice data corresponding to this text (character string). The generated voice data is input to the D/A converter 30, and voice reading out this text is output from the loudspeaker 32. A method, widely adopted as text-to-speech (TTS), can be used as this voice output technique.

The above-mentioned LINE mail receiving processing unit 54, the received mail determination unit 56, and the notification processing unit 57 respectively correspond to a mail receiving unit, a received mail determination unit, and a notification unit. The voice processing unit 58, the D/A converter 30, and the loudspeaker 32 correspond to a voice output unit. The display processing unit 20 and the display device 22 correspond to a display unit.

Figure 3:
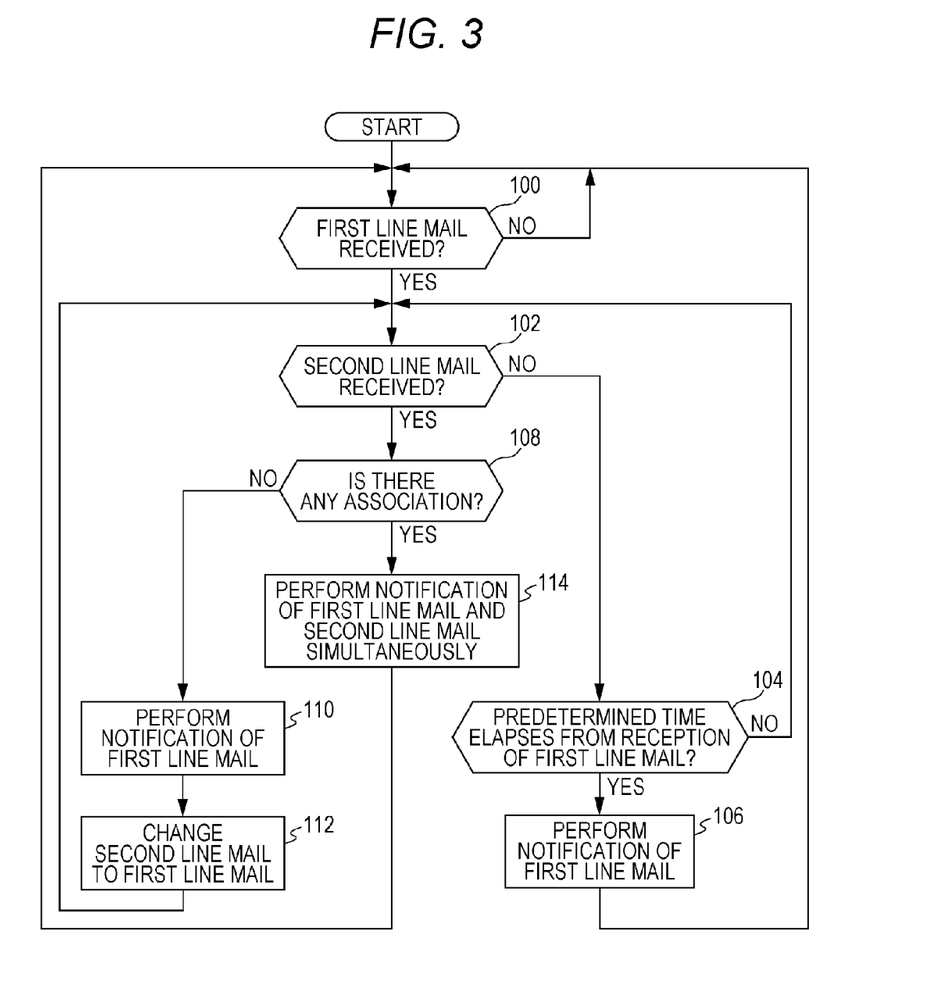
FIG. 3 is a flowchart illustrating an operation procedure performed when a LINE mail is received in a vehicle-mounted apparatus.

The vehicle-mounted apparatus 1 of the present embodiment has the above-described configuration. Next, an operation performed when a LINE mail is received and notification is performed will be described. FIG. 3 is a flowchart illustrating an operation procedure performed when a LINE mail is received in the vehicle-mounted apparatus 1. The LINE mail receiving processing unit 54 determines whether a first LINE mail is received (step 100). Here, the "first LINE mail" may refer to a LINE mail received after an interval of a predetermined time or longer. A LINE mail first received after the vehicle-mounted apparatus 1 starts up, and a LINE mail received after lapse of a predetermined time or longer from when the last LINE mail is received after one or more LINE mails are received correspond to the "first LINE mail." If the first LINE mail is not received, a negative determination is made at step 100, and this step is repeated.

If the LINE mail receiving processing unit 54 receives the first LINE mail, the LINE mail receiving processing unit 54 makes a positive determination in the determination at step 100. Next, the LINE mail receiving processing unit 54 determines whether a second LINE mail is received (step 102). Here, the "second LINE mail" refers to a LINE mail received next after the above-mentioned first LINE mail. If the second LINE mail is not received, a negative determination is made in the determination at step 102. Next, the notification processing unit 57 determines whether a predetermined time has elapsed from when the first LINE mail is received (step 104). If the predetermined time does not elapse, a negative determination is made, and the processing returns to step 102, in which the second LINE mail reception determination is repeated. If the predetermined time elapses, a positive determination is made in the determination at step 104. Then, the notification processing unit 57 notifies the user (e.g., a driver) of the vehicle-mounted apparatus 1 of the content of the first LINE mail (step 106). Specifically, if the content of the LINE mail is text, notification of the received first LINE mail is performed by displaying a character string constituting the text on the display device 22, and/or by generating, by the voice processing unit 58, voice data for reading out the text and outputting voice by reading out the text from the loudspeaker 32. Alternatively, if the content of the LINE mail is an image (a stamp), notification of the received first LINE mail is performed by displaying this image on the display device 22. Then, the processing returns to step 100, in which the first LINE mail reception determination is repeated.

If the LINE mail receiving processing unit 54 receives the second LINE mail, a positive determination is made in the determination at step 102. Next, the received mail determination unit 56 determines whether there is association between the first LINE mail received earlier and the second LINE mail received this time (step 108). If there is no association between the first and the second LINE mails, a negative determination is made. Then, the notification processing unit 57 notifies the user of the vehicle-mounted apparatus 1 of the content of the first LINE mail (step 110). Subsequently, the received mail determination unit 56 changes the second LINE mail to the first LINE mail (this change means that the received second LINE mail is treated as the first LINE mail in the subsequent processing) (step 112). Then, the processing returns to step 102, in which the second LINE mail reception determination is repeated.

If the first and the second LINE mails are associated with each other, a positive determination is made in the determination at step 108. Next, the notification processing unit 57 performs notification of these two LINE mails simultaneously (step 114). For example, in the present embodiment, it is assumed that text is included in the initially received first LINE mail and an image such as a stamp is included in the subsequently received second LINE mail (alternatively, a case is also conceivable where an image is initially received and text is subsequently received). In such a case, at the time when the second LINE mail is received, the content display of the text included in the first LINE mail and/or voice output for reading out the content of the text, and the content display of the image included in the second LINE mail are simultaneously performed. Then, the processing returns to step 100, in which the first LINE mail reception determination is repeated.

Figure 4:
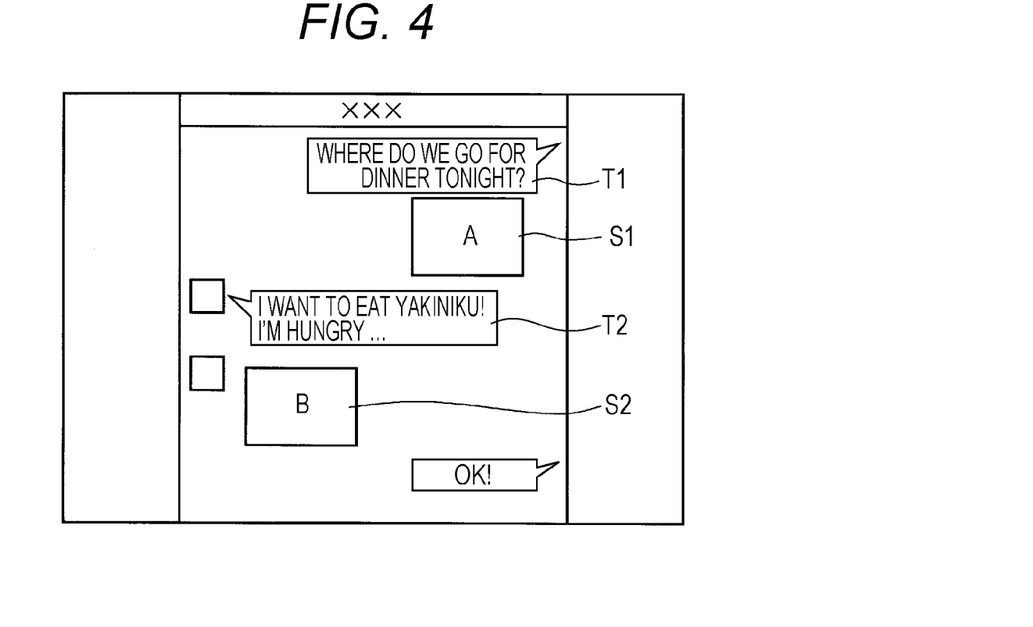
FIG. 4 is diagram illustrating an example of notification performed when a LINE mail is received in a vehicle-mounted apparatus.

FIG. 4 is diagram illustrating an example of notification performed when a LINE mail is received in the vehicle-mounted apparatus 1. In the example illustrated in FIG. 4, the user operating the vehicle-mounted apparatus 1 first creates a LINE mail including text T1 "Where do we go for dinner tonight?" as a content, and sends the created LINE mail to a specific partner (e.g., the user of the mobile terminal device 3). The user successively creates a LINE mail including a stamp S1 as a content, and sends the created LINE mail to the same partner.

Next, a first LINE mail including text T2 "I want to eat Yakiniku! I'm hungry . . . " as content is received from this partner. In addition, a second LINE mail including a stamp S2 as content is received from the same partner within a predetermined time. These first and the second LINE mails are sent from the same sender and the reception interval is within the predetermined time. Thus, these first and the second LINE mails are determined to be associated with each other. Accordingly, in the vehicle-mounted apparatus 1, reception notification is performed (e.g., the LINE mail receiving processing unit 54 displays reception notification and/or outputs reception notification sound) after the second LINE mail is received, and notification of the contents of these two LINE mails is performed simultaneously (e.g., the text T2 and the stamp S2 are simultaneously displayed). The user of the vehicle-mounted apparatus 1 can simultaneously check the contents of these first and the second LINE mails.

Figure 5:
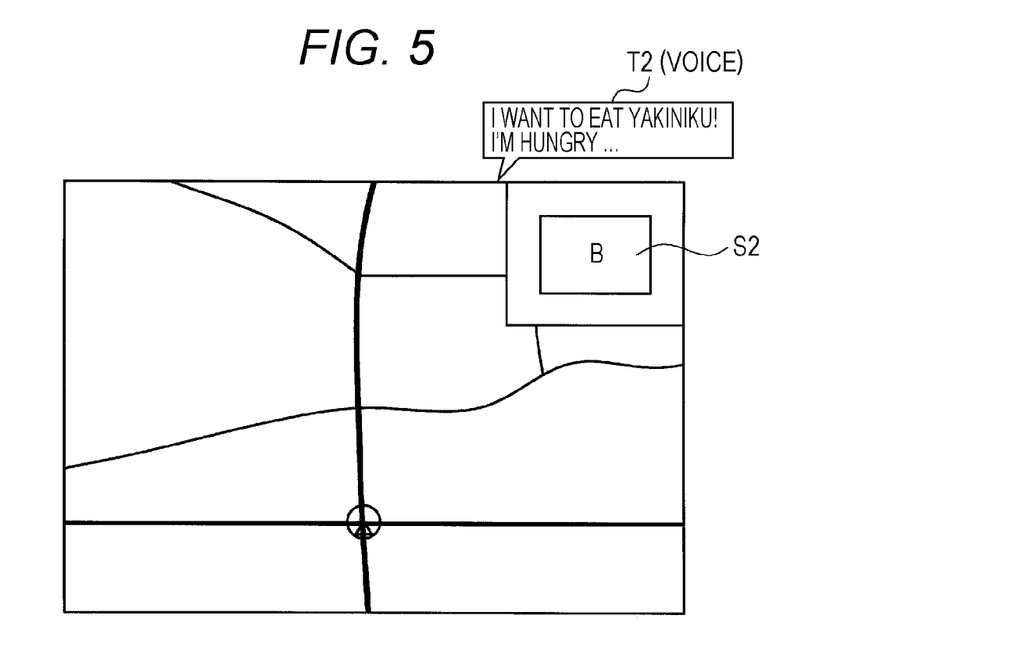
FIG. 5 is diagram illustrating a modified example of notification performed when a LINE mail is received in a vehicle-mounted apparatus.

FIG. 5 is diagram illustrating a modified example of notification performed when a LINE mail is received in the vehicle-mounted apparatus 1. In the example illustrated in FIG. 5, navigation processing is performed in the vehicle-mounted apparatus 1, and a vehicle-position vicinity map image is displayed on the display device 22. If the first and the second LINE mails as described in FIG. 4 are received in such a display state, the notification processing unit 57 instructs the voice processing unit 58 to output the voice reading out the text T2 "I want to eat Yakiniku! I'm hungry . . . " included in the first LINE mail from the loudspeaker 32, and displays the stamp S2 included in the second LINE mail in a part of a display screen (e.g., a part of the upper-right corner of the screen).

In this way, in the vehicle-mounted apparatus 1 of the present embodiment, when a plurality of LINE mails associated with each other is received at different timing, performing notification in accordance with a LINE mail received later reduces notification occasions, so that the trouble of checking the content of a received mail can be reduced.

In addition, if a plurality of LINE mails is sent from the same sender to the same sending partner within a short time, it is highly probable that the contents of the plurality of these LINE mails are associated with each other. Thus, collectively performing notification of these LINE mails substantially reduces the trouble of checking the contents by the recipient of these LINE mails.

In addition, if text (character string) and an image associated with the text are sent and received as separate LINE mails, notification can be performed after the reception of the text and the image is completed. As a result, the user can simultaneously check the contents of the text and the image.

In addition, performing voice output by reading out text (character string) included in a received LINE mail facilitates the checking of its content. In addition, if either one of two LINE mails associated with each other only includes text (character string) and the other one of them only includes an image, simultaneously performing voice output for reading out the text and image display enables the user to check the content of the text through the voice while looking at the image associated with the text. This further facilitates the checking of the respective contents of the text and the image.

In addition, the presence or absence of the association between two LINE mails may be determined based on the respective contents of a text and an image. For example, a character string represented by an image, such as "great!" "happy" and "sad" is associated with the image in advance, and if a character string of a LINE mail that is sent as text includes the character string associated with the image, it can be determined that there is association therebetween. In this way, if there is association between the contents of text and an image, collectively performing notification of a plurality of LINE mails including the text and the image as contents can substantially reduce the trouble of checking the contents by the recipient of these LINE mails.

In addition, the mail sending/receiving apparatus of the present disclosure may be mounted in a vehicle. If the mail sending/receiving apparatus is mounted in a vehicle, the operability, the screen visibility, and the like are far from excellent. Nevertheless, in such a case, by reducing the number of times notification is performed at the time when a LINE mail is received, the operation and the trouble of content check can be improved.

The present invention is not limited to the above embodiments, and various modified implementations are available within the scope of the present disclosure. For example, while the present invention is applied to the vehicle-mounted apparatus 1 in the above embodiment, the present invention can also be applied to a case where an apparatus is not mounted in a vehicle, for example, a case where a LINE mail is received using the mobile terminal device 3 (FIG. 1).

In addition, in the above embodiment, when two LINE mails are associated with each other, notification of these two LINE mails is performed in accordance with a LINE mail received later. Alternatively, when three or more LINE mails associated with one another are received, notification of these three or more LINE mails may be performed in accordance with a LINE mail received last.

In addition, in the above embodiment, the present invention is applied to a mail sending/receiving apparatus that receives a LINE mail. Nevertheless, the present invention can also be applied to a mail sending/receiving apparatus that receives an electronic mail other than a LINE mail.

As described above, according to the present disclosure, when a plurality of electronic mails associated with each other is received at different timings, performing notification in accordance with an electronic mail received later reduces notification occasions, so that the trouble of checking the content of a received mail can be reduced.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A mail sending/receiving apparatus for sending and receiving an electronic mail including at least one of a character string and an image, the mail sending/receiving apparatus being implemented as a computer executing a predetermined program stored in a memory and comprising:
   a mail receiving unit configured to receive the electronic mail;
   a received mail determination unit configured to determine, after a first electronic mail is received by the mail receiving unit, whether a second electronic mail associated with the first electronic mail is received by the mail receiving unit; and
   a notification unit configured to perform, when it is determined by the received mail determination unit that the first electronic mail and the second electronic mail are associated with each other, notification of the first and the second electronic mails simultaneously,
   wherein a notification of the first electronic mail is not performed before determining whether a second electronic mail associated with the first electronic mail has been received, and wherein, in a case where the second electronic mail is received from the same sender as that of the first electronic mail within a predetermined time from when the first electronic mail is received, the received mail determination unit determines that the first electronic mail and the second electronic mail are associated with each other.

2. The mail sending/receiving apparatus according to claim 1,
  wherein the mail receiving unit receives the first electronic mail only including one of a character string and an image and the second electronic mail only including the other one of the character string and the image.

3. The mail sending/receiving apparatus according to claim 1,
  wherein the mail receiving unit receives the first electronic mail only including one of a character string and an image and the second electronic mail only including the other one of the character string and the image.

4. The mail sending/receiving apparatus according to claim 1, further comprising:
  a voice output unit configured to output voice by reading out the character string; and
  a display unit configured to display the image,
  wherein the notification unit performs, in a case where each of the first and the second electronic mails only includes the character string, the notification by performing voice output corresponding to the included character string, from the voice output unit, and performs, in a case where each of the first and the second electronic mails only includes the image, the notification by displaying the included image on the display unit.

5. The mail sending/receiving apparatus according to claim 4,
  wherein, in a case where one of the first and the second electronic mails only includes the character string, and the other one of the first and the second electronic mails only includes the image, the notification unit simultaneously performs voice output by the voice output unit and image display by the display unit.

6. The mail sending/receiving apparatus according to claim 1,
  wherein one of the first and the second electronic mails includes the character string, and the other one of the first and the second electronic mails includes the image, and
  wherein the received mail determination unit determines whether there is association between the first electronic mail and the second electronic mail based on respective contents of the character string and the image.

7. The mail sending/receiving apparatus according to claim 1,
  wherein the mail sending/receiving apparatus is configured to be mounted in a vehicle.

8. A mail sending/receiving method for sending and receiving an electronic mail including at least one of a character string and an image, the mail sending/receiving method comprising:
  a mail receiving step of receiving the electronic mail by a mail receiving unit;
  a received mail determination step of determining, by a received mail determination unit, after a first electronic mail is received by the mail receiving unit, whether a second electronic mail associated with the first electronic mail is received by the mail receiving unit; and
  a notification step of performing, when it is determined by the received mail determination unit that the first electronic mail and the second electronic mail are associated with each other, notification of the first and the second electronic mails simultaneously by a notification unit, wherein, in a case where the second electronic mail is received from the same sender as that of the first electronic mail within a predetermined time from when the first electronic mail is received, the received mail determination step determines that the first electronic mail and the second electronic mail are associated with each other.

9. The mail sending/receiving method according to claim 8,
  wherein the mail receiving step receives the first electronic mail only including one of a character string and an image and the second electronic mail only including the other one of the character string and the image.

10. The mail sending/receiving method according to claim 8,
  wherein the notification step performs, in a case where each of the first and the second electronic mails only includes the character string, the notification by performing voice output corresponding to the included character string, and performs, in a case where each of the first and the second electronic mails only includes the image, the notification by displaying the included image.

11. The mail sending/receiving method according to claim 10,
  wherein, in a case where one of the first and the second electronic mails only includes the character string and the other one of the first and the second electronic mails only includes the image, the notification step simultaneously performs voice output and image display.

12. The mail sending/receiving method according to claim 8,
  wherein one of the first and the second electronic mails includes the character string, and the other one of the first and the second electronic mails includes the image, and
  wherein the received mail determination step determines whether there is association between the first electronic mail and the second electronic mail based on respective contents of the character string and the image.

13. A non-transitory recording medium recording a mail sending/receiving program for causing a computer to execute a predetermined program stored in a memory to function as:
  a mail receiving unit configured to receive an electronic mail including at least one of a character string and an image;
  a received mail determination unit configured to determine, after a first electronic mail is received by the mail receiving unit, whether a second electronic mail associated with the first electronic mail is received by the mail receiving unit; and
  a notification unit configured to perform, when it is determined by the received mail determination unit that the first electronic mail and the second electronic mail are associated with each other, notification of the first and the second electronic mails simultaneously,
  wherein a notification of the first electronic mail is not performed before determining whether a second electronic mail associated with the first electronic mail has been received, and wherein, in a case where the second electronic mail is received from the same sender as that of the first electronic mail within a predetermined time from when the first electronic mail is received, the received mail determination unit determines that the first electronic mail and the second electronic mail are associated with each other.

14. The recording medium according to claim 13,
  wherein the mail receiving unit receives the first electronic mail only including one of a character string and an image and the second electronic mail only including the other one of the character string and the image.

15. The mail sending/receiving apparatus according to claim 14,
wherein, in a case where one of the first and the second electronic mails only includes the character string and the other one of the first and the second electronic mails only includes the image, the notification unit simultaneously performs voice output by a voice output unit and image display by a display unit.

16. The recording medium according to claim 13,
wherein one of the first and the second electronic mails includes the character string, and the other one of the first and the second electronic mails includes the image, and
wherein the received mail determination unit determines whether there is association between the first electronic mail and the second electronic mail based on respective contents of the character string and the image.

17. The recording medium according to claim 13,
wherein the computer is configured to be mounted in a vehicle.

* * * * *